US010480482B1

(12) United States Patent
Ross et al.

(10) Patent No.: US 10,480,482 B1
(45) Date of Patent: Nov. 19, 2019

(54) BIOMORPHIC INSHORE WAVE ENERGY CONVERTER

(71) Applicants: Gary Ross, Oxnard, CA (US); Griffin Ross, Oxnard, CA (US)

(72) Inventors: Gary Ross, Oxnard, CA (US); Griffin Ross, Oxnard, CA (US)

( * ) Notice: Subject to any disclaimer, the term of this patent is extended or adjusted under 35 U.S.C. 154(b) by 0 days.

(21) Appl. No.: 16/200,558

(22) Filed: Nov. 26, 2018

Related U.S. Application Data

(60) Provisional application No. 62/590,802, filed on Nov. 27, 2017.

(51) Int. Cl.
F03B 13/18 (2006.01)

(52) U.S. Cl.
CPC .......... *F03B 13/182* (2013.01); *F03B 13/189* (2013.01); *F05B 2240/40* (2013.01); *F05B 2240/97* (2013.01); *F05B 2250/22* (2013.01); Y02E 10/38 (2013.01)

(58) Field of Classification Search
CPC ................ F03B 13/189; F03B 13/1885; F03B 13/1895; F03B 13/20; F03B 13/182; F05B 2250/22; F05B 2240/40
See application file for complete search history.

(56) References Cited

U.S. PATENT DOCUMENTS

| 7,023,104 | B2 * | 4/2006 | Kobashikawa | B01D 61/10 290/42 |
| 7,834,474 | B2 * | 11/2010 | Whittaker | F03B 13/182 290/53 |
| 8,974,192 | B2 | 3/2015 | Ross | |
| 9,695,796 | B1 | 7/2017 | Ross | |
| 9,902,467 | B2 * | 2/2018 | Lin | F03B 13/182 |
| 2005/0066654 | A1 * | 3/2005 | Koivusaari | F03B 13/182 60/398 |
| 2013/0140943 | A1 * | 6/2013 | Jean | F03B 11/00 310/300 |
| 2014/0196451 | A1 * | 7/2014 | Bateman | F03B 13/182 60/499 |
| 2014/0230426 | A1 * | 8/2014 | Tuokkola | F03B 13/16 60/497 |
| 2016/0061180 | A1 * | 3/2016 | Eavis | F03B 13/182 290/53 |
| 2019/0003449 | A1 * | 1/2019 | Gren | F03B 13/182 |

FOREIGN PATENT DOCUMENTS

| DE | 102009016916 A1 * | 10/2010 | ............ F03B 13/182 |
| GB | 2480325 A * | 11/2011 | ............ F03B 13/182 |
| WO | WO-2018150387 A1 * | 8/2018 | ............ F03B 13/182 |

* cited by examiner

Primary Examiner — Mark A Laurenzi
Assistant Examiner — Xiaoting Hu
(74) Attorney, Agent, or Firm — Thomas I. Rozsa

(57) ABSTRACT

A wave energy collector placed in ocean water a given distance from a shoreline, the wave energy collector formed by at least one parallelogram structure with an even number of mechanical actuators are positioned within the parallelogram structure. Each mechanical actuator has a respective hose with a check valve to suck ocean water in and blow ocean water out under pressure for energy conversion.

6 Claims, 8 Drawing Sheets

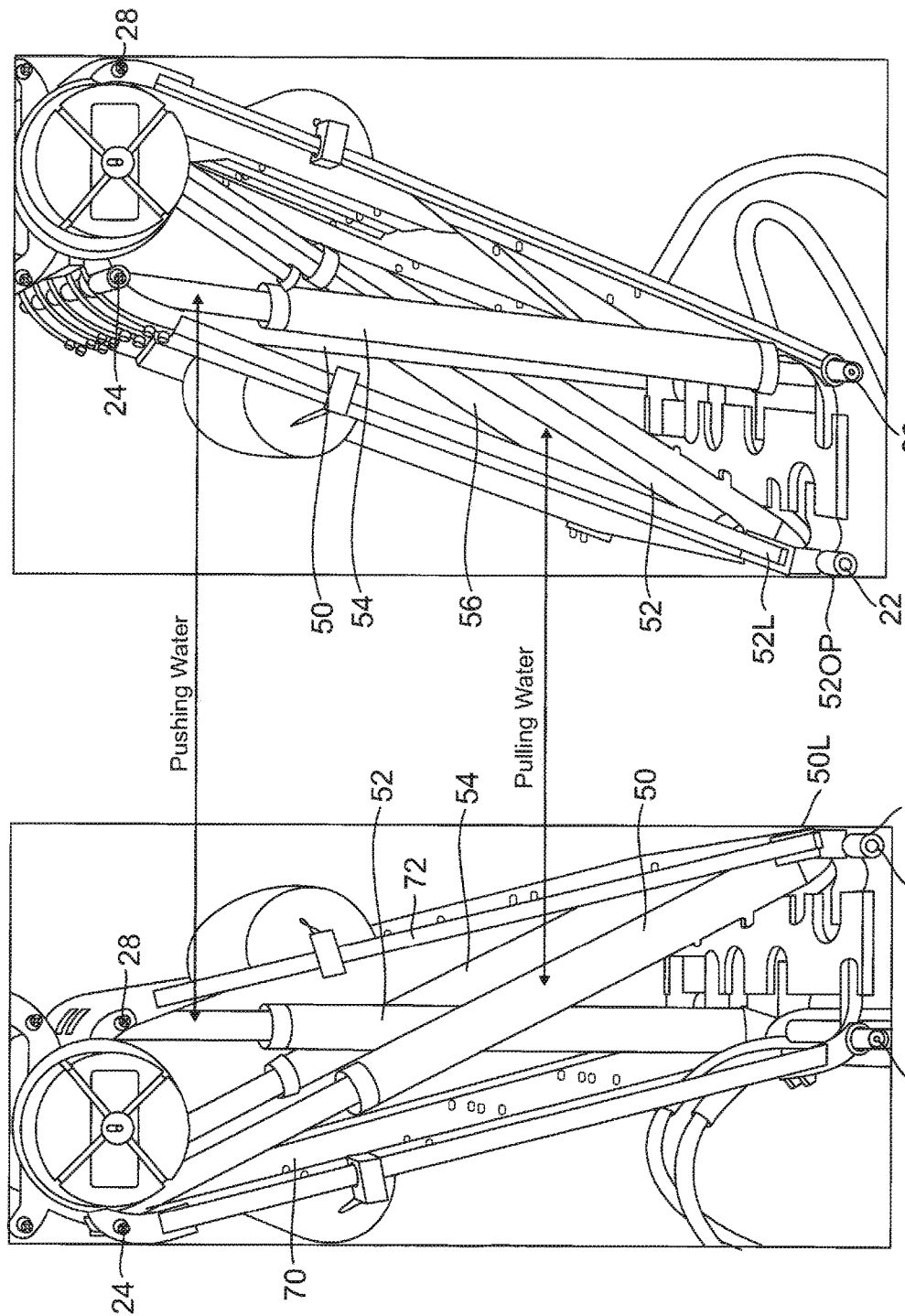

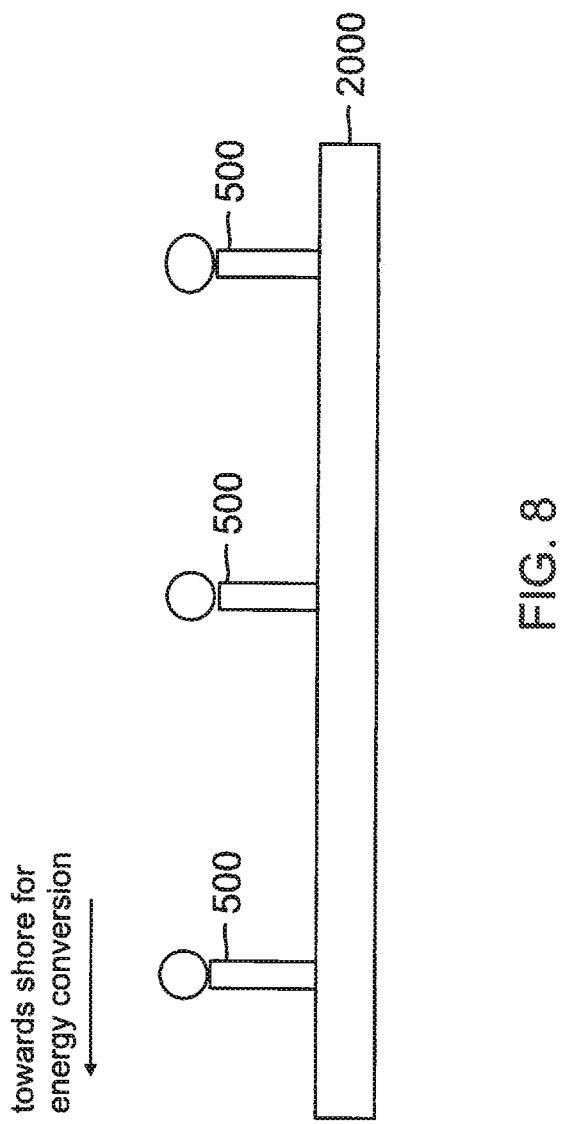

BIOMORPHIC INSHORE WAVE ENERGY CONVERTER

CROSS-REFERENCE TO RELATED APPLICATION

This patent application claims priority to Provisional Application Ser. No. 62/590,802 filed on Nov. 27, 2017.

BACKGROUND OF THE INVENTION

1. Field of the Invention

The present invention relates to a field of devices designed for a patented shoaling reef of HDPE pipe located just offshore. The devices collectively convert and transfer the ocean energy to pressurized seawater transferred through specific structural pipes of the reef to shore for conversion to desalination, estuary flushing for mariculture or for wave energy.

2. Description of the Prior Art

One of the present inventors, Gary Ross, is an innovator in the field of the present invention. The closest prior art of which inventor Gary Ross is aware are his own two inventions disclosed in the following United States patents:

1. U.S. Pat. No. 9,695,796 issued on Jul. 4, 2017 for "PARALLELOGRAM WAVE ENERGY COLLECTOR" which discloses a parallelogram that has plates which allow water to enter and exit a water retaining diaphragm The plates are impacted by ocean waves and compress the diaphragm to force water to exit the diaphragm under force, The water is transmitted through pipes to a shoreline energy conversion device.

2. U.S. Pat. No. 8,974,192 issued on Mar. 10, 2015 for "BIOMORPHIC WAVE ENERGY COLLECTOR", which discloses a parallelogram wave energy collector called a sea fan which has a completely enclosed deformable bladder which is a first generation to the invention disclosed and claimed in the first patent described above.

SUMMARY OF THE INVENTION

The present invention is an improvement over the previous patented inventions by Gary Ross and includes the creative input of Griffin Ross, Gary's son. The present invention does not involve the use of elastomeric bladders. Instead, the present invention incorporates a unique system of mechanical actuators affixed between plates which are impacted by ocean waters to capture and push pressurized sea water into pipelines for shoreline energy conversion.

Research verifies that wave energy which is slowed down becomes more elliptical due to a rounded spring-like vector force configuration in deeper water offshore. This energy is slowed down from its contact with the ocean bottom on the inshore flow, causing a more elliptical form of energy from the wave. This resistance on the bottom also serves to direct the energy directly to the shore as observed on most any beach. This is the state of the wave just before it breaks to release all of the energy the wave still carries from hundreds or thousands of miles.

Offshore swells can come from any angle. Depending on the location and strength of the storm, the energy is determined by the amount of time and intensity of the wind on the surface of the ocean. This cylindrical wave force is unique and efficiently travels across long distances with very little loss of energy.

When this energy moves closer to shore, waves push this energy forward towards the beach. As expected, there is a simple force coming back from the opposite direction caused from this elliptical force and it is away from the beach and back outward. This combined wave energy force is smooth and methodical and varies in strength and with the period of the wave to the shore and away from the shore.

It has been estimated that the energy can be seven times stronger on the top of a wave compared to the bottom of the wave. Surfers experience this as they duck dive under a wave to a lower energy zone below the wave when trying to paddle out. The simplicity of an elastomeric bladder facilitates longevity. However, one possible problem is that it may be more difficult to capture the subtle energy at the very top of the wave if the bladder design is not perfectly efficient. The force can be equal in both directions because of the dynamics of this elliptical energy near shore as the wave energy is pushed back to sea.

The present inventors have discovered that it is possible to configure and use traditional mechanical actuators in stainless steel compression tubes that look like shock absorbers. It has been discovered that the slightest movement would compress the mechanical actuators to push water to drive a turbine if pairs of the mechanical actuators are always attached to the opposite sides or diagonally on the framework of the axles of the parallelogram (POG).

It has been discovered that it is unique to have the mechanical actuators configured into a POG in opposite and both sides giving unique advantages considering the unique forces of the wave as described. With the energy coming from both sides, one side pushes water from the compression tubes and the energy from the other side reloads the tubes with water to push on the next cycle.

Inshore wave energy capturing mechanisms are rarely used in the intertidal environment because of the chaotic nature of that environment. As described, the conversion to a more elliptical force is common in the inshore environment where the cylindrical energy offshore would not contribute to the added benefit of the slowed down elliptical energy. These current and historic designs all work the same for the mechanical actuator to load up on one cycle and push on the next cycle. The idea of a POG with the mechanical actuators located on opposite corners is unique. This produces a continual flow and also doubles the output with twice the efficiency and yield. The present invention has significant benefits in the near shore environment where the elliptical energy makes this discovery important.

In the quest for blue green energy, it is an advantage to have continuous flow instead of off and on pressure to be converted to electrical energy. This is a significant benefit to the two shock absorbers working in an opposite manner. It also provides a good stability for the longevity of the mechanism. The parallelogram (POG) is a unique design for this use. Each of the movable corners is designed to have very little resistance and lends itself to compress and extend mechanical actuators at the same time if there is a balance of at least one on each side. The use of two mechanical actuators on each side provides more balance for longevity and additional yield. This is a novel use of these mechanical actuators in a very unique environment and provides an important and unexpected result.

If four mechanical actuators are used, each one will have one plumbing line that leads to a check valve that will allow water to enter the chamber with suction when each respective tube is in the elongation mode. The four (4) mechanical actuators are configured and attached on diagonal corners with simple rods in each of the four sides of a POG. Any even number of mechanical actuators can be used with the present invention.

There is more net energy on the top of the water in the ocean including the area near the shore. Tides vary considerably anywhere and everywhere around the world. Tides tend to be more dramatically different from high tide to low tide and more dramatic away from the equator. Most efforts to capture wave energy are offshore. Tides can vary from less than one to eleven meters near shore. Any tide variation will not have as much effect in the typical 80-meter plus deep range. Most offshore efforts are located on the top of the water and roll with any tide.

There are advantages to trying to capture energy near the shore. However, the energy tends to be chaotic and consistently changing in sand bottoms. The present design discovery involves being located on an engineered reef to insure a stable collection area precisely located above a dynamic sand bottom.

Tide variation can be critical for inshore wave energy designs. Any design will be less effective if the POG rests on the bottom of the water column. Due to the fact that the top of the POG can match the approximate elevation of sea level, it can become a simple base for another POG mounted on top of it. The reason to consider stacking a POG is that the energy is always stronger at the very top of the water column. Tests have verified that the articulation of one or two or more POGs will conform easily to different water heights from high or low tides and transfer the motion to compression for mechanical actuators in any or in all of the stacked POGS.

It is an advantage of the present invention POG system that it can easily float to the top of the ocean water level. If a double POG is used, it is preferred for the top not to extend above or much above the surface of the ocean water. This design considers and allows easy movement in many directions with the plane going from the inshore to the offshore. It is possible to always access the top of the high-energy area if more than one POG is used and local tides are taken into consideration.

It has been discovered that with a double POG, if it floats into or is located into the most energetic wave energy area on the top, it will pull the bottom POG along with it and will add more force to compression. It was further discovered in tank testing that this configuration has better results even if the mechanical actuators are only on the bottom POG. This result makes it clear that it is practical and possible to stack more than two and would offer other potential to the possibility of a larger colony of collectors all located on the patented offshore high density polypropylene reef. The result is more stacked waive collectors offshore and yet still connected to the most powerful wave energy zone.

It has been further discovered that the POGs may be stacked on top of each other to utilize the top of the higher energy zone in deeper water or act with two or three to receive the local tide.

It is a further object of the present invention to have the POG design by definition to include two opposite sides that will always be parallel. The POG may be mounted on a reef made of larger diameter high density polypropylene or on a horizontal foundation in the intertidal zone. The number of mechanical actuators in a POG typically starts at either two or four but also can be any number in one POG. A plurality of POGs can be mounted on the very top plate of the one below it allowing the present invention to "see" or capture the energy closer to the top. This also allows the POG collectors to go into deeper water further offshore. The plumbing for each set in a potential chain of connected POGs must be specific to that POG as each will have independent movement by design. The plumbing for the intake and exit ports can be shared per POG. It is also possible that the pressurized water can funnel into one exit port for the stack of POGs. The outflow hoses can also be shared with a colony of POG stacks with a common plumbing main that goes to the shore or to an all pipe reef to deliver pressurized water for conversion. The intake of sea water can be on a check valve on the mechanical actuator or can come from a hose that extends away from the intake check valve which allows the intake to be closer to the surface to eliminate sediment near the bottom in the plumbing line that could hurt the performance of the mechanical actuators.

If a colony or large number of the present invention POGs is installed on a pipe reef system, each POG may have separate plumbing for delivery of pressurized water to an inshore energy conversion device.

It is a further object of the present invention POG design to be smaller or larger to access the top and bottom of the wave energy for a wave or series of waves. This can be done with larger or smaller panels and larger or smaller mechanical actuators.

It is a further object of the present invention for the POGs to be pushed to the bottom of the ocean or significantly lower than the upper portion of the high energy generating portion of the wave for large and extremely large waves. This design allows the equipment to hide from very aggressive energy if it overrides the maximum flotation to lay down. A simple leveraged latch can be mounted on the reef to capture the reef's topmost element if it exceeds the desired amount of force pushing it. Sensors can also be used to know when thresholds are passed and to engage a lock down or to release each chain of POG units.

It is also an object of the present invention for the completed POG or series of POGs to have 3D printed forms to fit over the POGs. An elastomeric costume may be added to cover the present invention and make it more ocean friendly through biomimicry. This elastomeric exterior will cover the POGs and can look like a species of kelp or other similar or non-similar species found in nature.

Defined in detail, the present invention is a wave energy collector placed in ocean water at a given distance from a shoreline, the wave energy collector comprising: (a) at least one parallelogram structure with a first side plate having a given width and a given height, a first axle affixed adjacent to a bottom of the first side plate and extending along the width of the first side plate, a second axle affixed adjacent to a top of the first side plate and extending along the width of the first side plate; (b) a second side plate having a given width and a given height, a third axle affixed adjacent to a bottom of the second side plate and extending along the width of the second side plate, a fourth axle affixed adjacent to a top of the second side plate and extending along the width of the second side plate; (c) a bottom plate affixed to the first side plate and affixed to the second side plate and a top plate affixed to the first side plate and affixed to the second side plate; (d) a first mechanical actuator affixed at a first end to the first axle and affixed at a second end to the fourth axle and a second mechanical actuator extending in an opposite direction and affixed at a first end to the third axle and affixed at a second end to the second axle; (e) a one-way intake valve connected to a first junction box, a first hose connected at one end to the first junction box and connected in fluid connection at a second end to a mechanical actuator and a second hose connected at one end to said first junction box and connected in fluid connection at a second end to said second mechanical actuator; (f) a first one-way exit check valve connected to the first junction box and located opposite to the first junction box one-way intake check valve, a hose connecting the first one-way exit check valve to water transport pipes affixed to the parallelogram structure; and (g) the first side plate and second side plate move in a counterclockwise direction when impacted by an on-shore wave causing the second mechanical actuator to expand and suck in water during an expansion stroke and concurrently causing the first mechanical actuator to compress and push out water during a compression stroke, and when the side plates are impacted from an onshore wave, the first and second side plates move in a clockwise direction causing the first mechanical actuator to expand and suck in water during an expansion stroke and concurrently causing the second mechanical actuator to compress and push out water during a compression stroke, the expansion stroke causing water to enter trough the one-water intake check valve, flow through a respective first or second connector hose and store water in the first mechanical actuator and second mechanical actuator and the compression stroke pushing water out of the mechanical actuators, through a respective first connector hose or second connector hose through second one-way check valve to the second house to the water transport pipe; (h) whereby the pressurized water is transported through the water transport pipe to an inshore apparatus which converts the pressurized water into a source of power or for desalinization.

Further defined in detail, the present invention is a wave energy collector comprising: (a) a third mechanical actuator affixed at a first end to the first axle and affixed at a second end to the fourth axle and a fourth mechanical actuator extending in an opposite direction and affixed at a first end to the third axle and affixed at a second end to the second axle; (b) a second junction box directly connected to a second inflow check valve, a third hose connected at one end to the second junction box and connected in fluid connection at a second end to said third mechanical actuator and a fourth hose connected at one end to said second junction box and connected in fluid connection at a second end to said fourth mechanical actuator, (c) a second one-way exit check valve connected to the second junction box and located opposite to the second junction box one-way intake check valve, a hose connecting the second one-way check valve to a T-connector, the hose from the first one-ay exit check valve connected to the T-connector, the T-connector having a third exit check valve connected to a connecting hose connected to water transport pipes affixed to the parallelogram structure; and (d) the first side plate and second side plate move in a counterclockwise direction when impacted by an on-shore wave causing both the second mechanical actuator and the fourth mechanical actuator to expand and suck in water during an expansion stroke and concurrently causing both the first mechanical actuator and the third mechanical actuator to compress and push out water during a compression stroke, and when the side plates are impacted from an onshore wave, the first and second side plates move in a clockwise direction causing the first and third mechanical actuator to expand and suck in water during an expansion stroke and concurrently causing the second and fourth mechanical actuators to compress and push out water during a compression stroke, the expansion stroke causing water to enter through the first junction box one-way water intake check valve, flow through a respective first or second connector hose and store water in the first mechanical actuator and second mechanical actuator and the compression stroke pushing water out of the mechanical actuators, through a respective first connector hose or second connector hose through first one-way check valve to the first connector hose to a third junction box and the expansion stroke causing water to enter trough the second junction box one-way water intake check valve, flow through a respective third or fourth connector hose and store water in the third mechanical actuator and fourth mechanical actuator and the compression stroke pushing water out of the mechanical actuators, through a respective third connector hose or fourth connector hose through second one-way check valve to the second connector hose to the third junction box at a third exit valve from the third junction box to the water transport pipe.

Further novel features and other objects of the present invention will become apparent from the following detailed description and discussion.

BRIEF DESCRIPTION OF THE DRAWINGS

Referring particularly to the drawings for the purpose of illustration only and not limitation, there is illustrated:

FIG. 2 is a close-up side view of an operating portion of the present invention single parallelogram wave energy collector illustrating the side plate having been hit by an onshore wave and beginning to rotate in the counterclockwise direction with two mechanical actuators in an expansion stroke for sucking water into the mechanical actuators and two oppositely oriented actuators in the compression stroke and pushing water out of the mechanical actuators;

FIG. 3 is a close-up side view of an operating portion of the present invention single parallelogram wave energy collector illustrating the side plate having been hit by an ocean wave and beginning to rotate in the clockwise direction with two mechanical actuators oriented in opposite directions from the view in FIG. 2, with two actuators in a compression stroke pushing water out of the mechanical actuators and two oppositely oriented mechanical actuators in the expansion stroke and sucking water into the mechanical actuators;

FIG. 8 is a schematic of a series of POGs, and placed in a series or in the same line.

DETAILED DESCRIPTION OF EMBODIMENTS OF THE PRESENT INVENTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
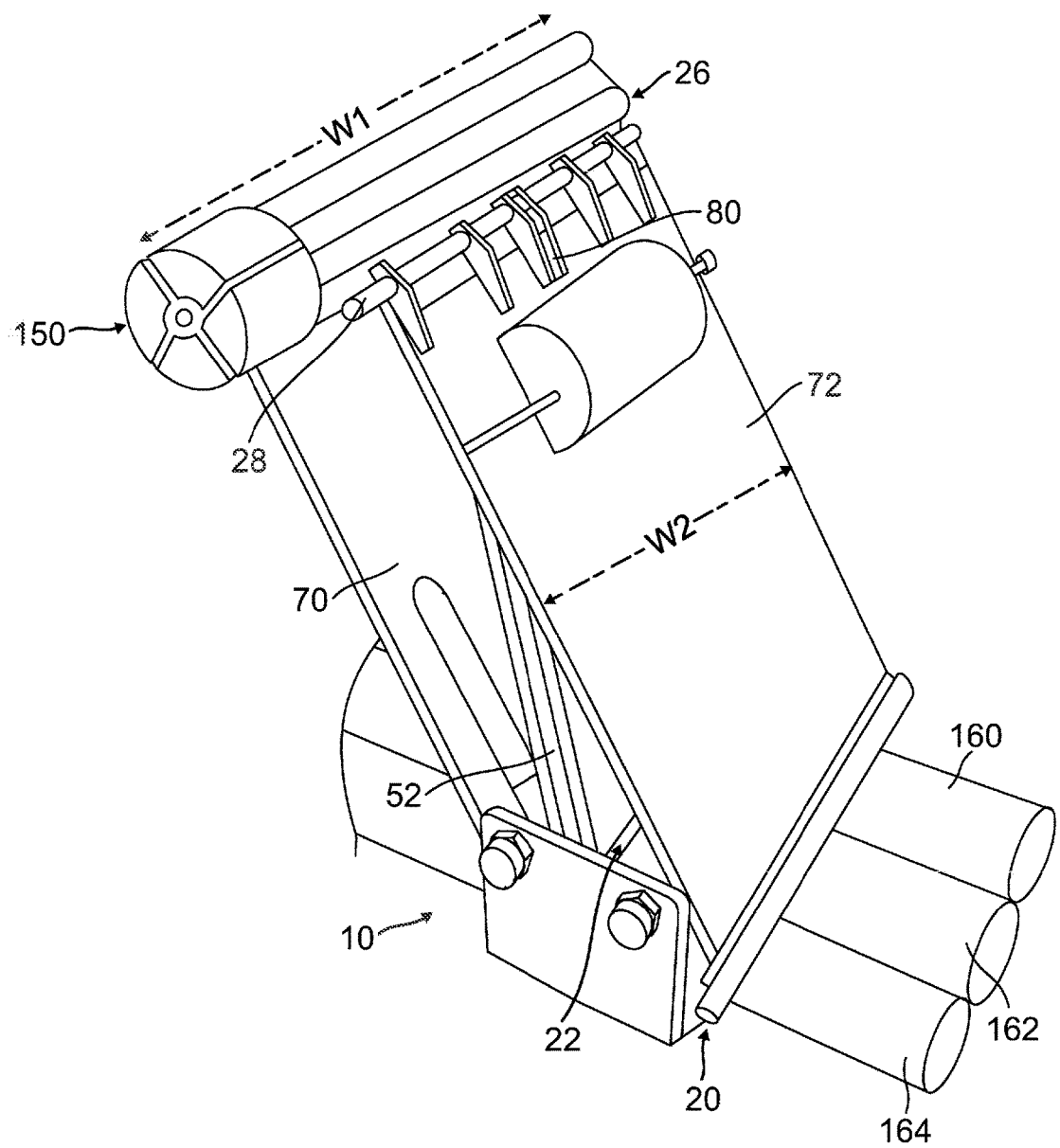
FIG. 1 is a side perspective view of the present invention single parallelogram wave energy collector.

Referring to FIG. 1, there is illustrated a perspective view of a single parallelogram 10 having the following visible components: a first side plate 70, a spaced apart parallel second side plate 72 one of the axles 28, rotation member 80 by which the axle 28 is affixed to side plate 72, connecting actuator 52, and water transport pipes 160, 162, 164. Axle 28 is rotatably affixed to side plate 72 by rotation members 80.

Referring to FIG. 2, there is illustrated a close-up side view of an operating portion of the present invention single parallelogram wave energy collector 10 illustrating the side plates 70 and 72 having been hit by an onshore wave and beginning to rotate in the counterclockwise direction with two mechanical actuators 50 and 54 in an expansion stroke for sucking water into the mechanical actuators and two oppositely oriented mechanical actuators 52 and 56 (see FIG. 3) in the compression stroke for pushing water out of the mechanical actuators.

FIG. 3 is a close-up side view of an operating portion of the present invention single parallelogram wave energy collector 10 illustrating the side plates 70 and 72 having been hit by an ocean wave and beginning to rotate in the clockwise direction with the two mechanical actuators 52 and 56 in an expansion stroke for sucking in water into the mechanical actuators and the two mechanical actuators 50 and 52 in a compression stroke for pushing water out of the mechanical actuators.

To understand how the mechanical actuators are affixed to adjacent the side plates, reference is made to FIGS. 1, 2 and 3. A first bottom axle 22 is affixed adjacent to a bottom of first side plate 70 and extends for a first width "W1" of first side plate 70. A first top axle 24 is affixed adjacent to a top of first side plate 70 and extends for the first width of first side plate 70. A second bottom axle 26 is affixed adjacent to a bottom of second side plate 72 and extends for a second width "W2" of second side plate 72. A second top axle 28 is affixed adjacent to a top of second side plate 72 and extends for the second width of second side plate 72.

The fundamental concept of the present invention is to use mechanical actuators with an even number of mechanical actuators such as two, four, six, etc. in each parallelogram with one of the mechanical actuators affixed in one direction from a top axle affixed at one side plate to a bottom axle affixed at an opposite side plate and a second mechanical actuator affixed in an opposite crisscross direction and affixed from a top axle affixed to a second side plate to a bottom axle affixed to an opposite sidewall. Therefore, as the side plates are hit by an on shore wave, the side plates rotate in a counterclockwise direction causing on actuator to move to an expansion stroke while the second mechanical actuator moves to a compression stroke. When the side plates are hit by an ocean wave, the side plates rotate in a clockwise direction with the two mechanical actuators moving to opposite stroke positions.

In FIGS. 2 and 3, mechanical actuators 50 and 54 are affixed to axle 24 and 26 and mechanical actuators 52 and 56 affixed to axles 22 and 28. The side plates 70 and 72 primarily rotate on bottom axles 22 and 26 with rotation to clockwise and counterclockwise positions facilitated by top axles 24 and 28. Bottom plate 40 and top plate 60 hold side plates 70 and 72 together.

Figure 4:
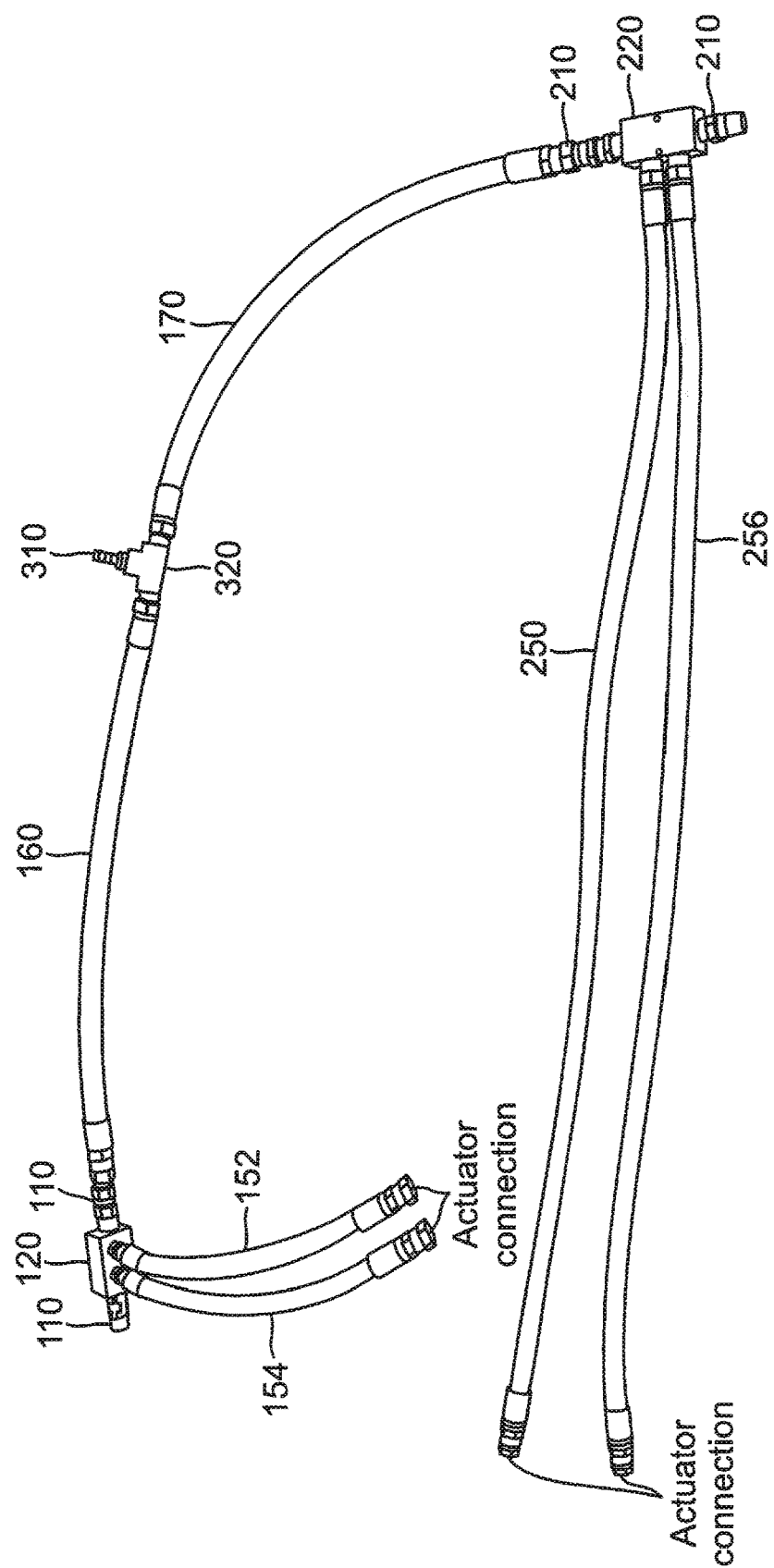
FIG. 4 is a perspective view of the hoses for four mechanical actuators, the two shorter hoses respectively connecting two respective mechanical actuators to a first junction box to split water flow between the two hoses, the first junction box having a water intake valve and a water exit valve connected by a first connecting hose to a joint water exit valve, the two longer hoses respectively connecting two respective mechanical actuators to a second junction box to split water flow between the two hoses, the second junction box having a water intake valve and a water exit valve connected by a second connecting hose to a the joint water exit valve.

Referring to FIG. 4, there is illustrated a perspective view of the hoses for four mechanical actuators, the two shorter hoses respectively connecting a respective mechanical actuator to a first junction box to split water flow between the two hoses, the first junction box having a water intake valve and a water exit valve connected by a first connecting hose to a joint water exit valve, the two longer hoses respectively connecting a respective mechanical actuator to a second junction box to split water flow between the two hoses, the second junction box having a water intake valve and a water exit valve connected by a second connecting hose to a the joint water exit valve.

Figure 5:
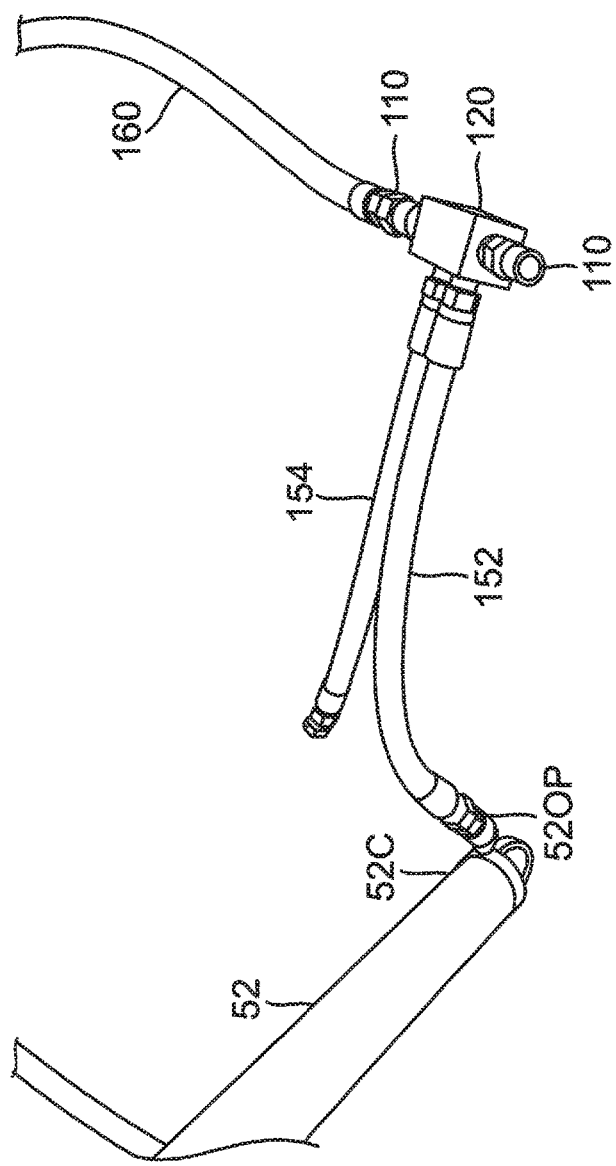
FIG. 5 is a perspective view of an example of a mechanical actuator hose connected to a junction box at one end and connected to a mechanical actuator.

FIG. 5 is a perspective view of an example of an mechanical actuator hose connected to a junction box at one end and connected an mechanical actuator.

Figure 6:
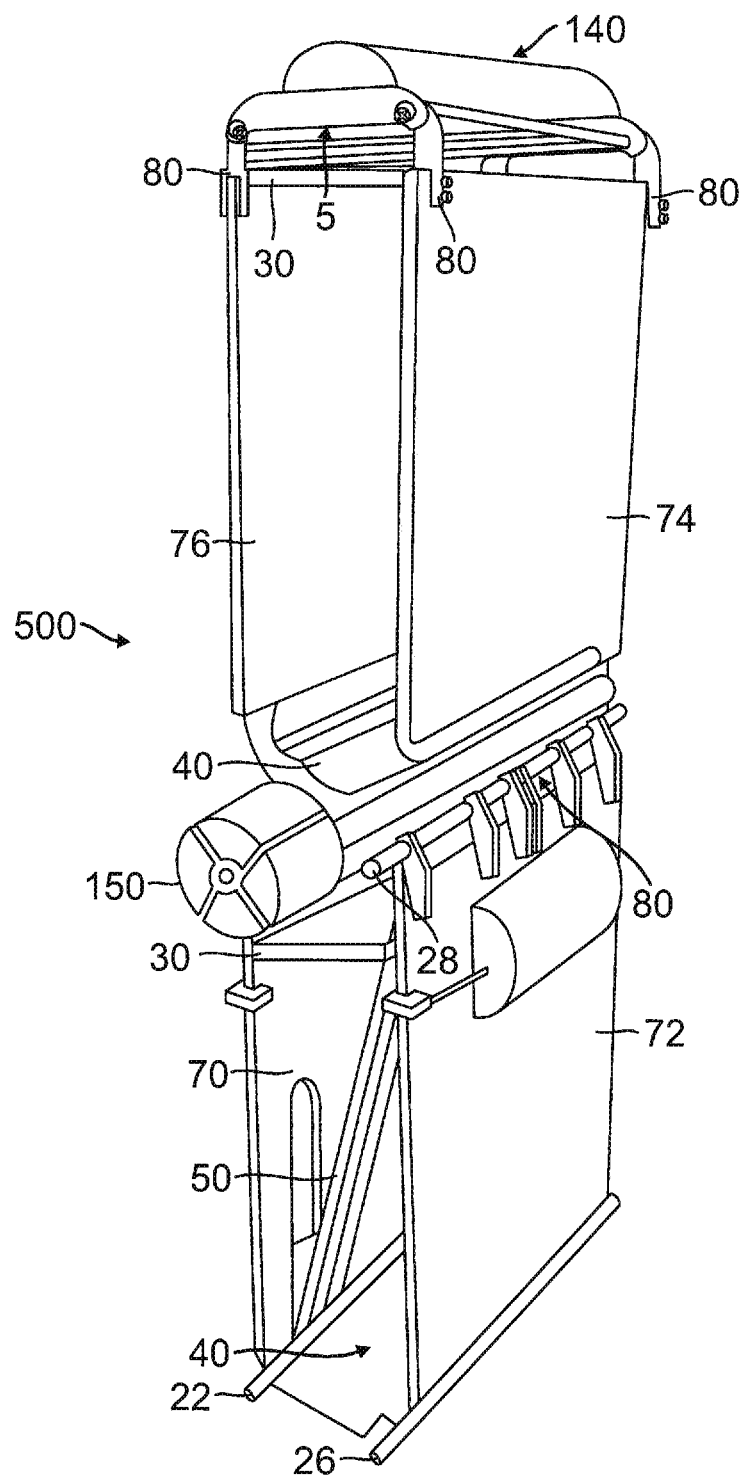
FIG. 6 is a side perspective view of a double parallelogram wave energy collector.

Referring to FIGS. 1, 2, and 6, there is illustrated the present invention parallelogram (POG) structure 10 that has four rods or axles 20, 22, 24 and 26 a top plate 30 (better illustrated in the double POG of FIG. 6), a bottom plate 40 (also better illustrated in the double POG of FIG. 6), a first side plate 70 and a second opposite side plate 72. The present invention parallelogram structure 10 also has at least two, and typically four or more or any even number of mechanical actuators 50, 52, 54 and 56 respectively attached to the four axles 20, 22, 24, and 26.

Further referring to FIGS. 1 and 6, there is illustrated a floatation member 140 (FIG. 6) that is positioned at the top of each of the parallelogram structures to allow the parallelogram structure to stand upright in an initial condition with side plates 70 and 72 generally perpendicular to the ocean floor. Floatation member 140 is not shown in FIG. 1; however, it should be understood that the floatation member 140 in FIG. 6 for the double POG will be in the same upper location for the single POG illustrated in FIG. 1.

Referring to FIG. 1, the position of the parallelogram structure in FIG. 1 is angled to illustrate a movement in the counterclockwise direction after a wave has struck side plate 72.

Further illustrated in FIG. 1 are outflow pipes 160, 162, and 164 that channel the pressurized water generated by the present invention POG structure 10 towards the shore line or to a reef for a multitude of energy uses or energy conversion.

Referring to FIGS. 2 and 3, there is illustrated a close-up view of the present invention parallelogram structure 10 having four mechanical actuators. FIG. 2 illustrates two mechanical actuators 50 and 54 in the expanding position. In this expanding position, the mechanical actuators are receiving or taking in water. FIG. 2 also shows mechanical actuator 52 in the compression position. In the compression position mechanical actuator 52 is pushing water out of the mechanical actuator. It should be understood that there is a second mechanical actuator (mechanical actuator 56) that is performing the same function as mechanical actuator 52 and is in parallel to mechanical actuator 52.

Referring to FIG. 3, there is illustrated the same mechanical actuators illustrated in FIG. 2; however, in FIG. 3 these same mechanical actuators have changed from being in either the compression or expansion state to being in either the expansion or the compression state. Therefore, in FIG. 3 mechanical actuators 50 and 54 are now in the compression state and forcing water out of the mechanical actuator and mechanical actuators 52 and 56 are now in the expansion state and receiving or pulling water into the mechanical actuators.

Referring to FIG. 4, there is illustrated a perspective view of a hose connection assembly for four mechanical actuators. Ocean water enters the mechanical actuators through a first one-way intake check valve 110 or a second one-way check valve 210. Flow from either one-way check valve respectively enters first junction box 120 or second junction box 220. Flow from junction box 220 can then enter hoses 256 and 250. The flow of water enters the mechanical actuator 56 through a hose 256 having a first connection that connects to junction box 220 at one end and connects to mechanical actuator 56 at a second end. Similarly, flow from junction box 220 can enter hose 250 having a first connection that connects to junction box 220 at one end and connects to mechanical actuator 50 at a second end. During the expansion process of mechanical actuators 50 and 56, ocean water is thereby pulled into mechanical actuators 50 and 56 via hoses 250 and 256 after entering junction box 220. As can be seen from FIG. 3, hose lengths 250 and 256 are longer than hose lengths 152 and 154. The increased length of hose for hoses 250 and 256 is to accommodate the location of the entrance at the mechanical actuator. For a double parallelogram, which will be explained in more detail to follow, the hose lengths must extend further to connect with the location of the mechanical actuators. Also, it is within the spirit and scope of this invention for two of the mechanical actuators as shown in FIG. 2, to be inverted. In either of these scenarios, the longer hose lengths will be needed to connect with the locations of the mechanical actuators.

Further referring to FIG. 4, flow from junction box 120 can then enter hose 152 and 154. The flow of water, as explained in the previous paragraphs, will enter the mechanical actuator via hose 152 having a first connection that connects to junction box 120 at one end and connects to mechanical actuator 52 at a second end. Similarly, flow from junction box 120 can enter hose 154 having a first connection that connects to junction box 120 at one end and connects to mechanical actuator 54 at a second end.

During the compression stage or stroke (these terms are used interchangeably throughout this text) of the mechanical actuators, flow from each mechanical actuator will be pushed out of the mechanical actuators and through a respective hose to a one-way check valve that flows outwardly to be used for energy conversion. Referring to FIGS. 4 and 5, in the compression stroke or stage for each mechanical actuator, flow exits at a lower portion of each mechanical actuator. By way of example, mechanical actuator 52 has an mechanical actuator lower portion 52L that has an opening 520P that connects to hose 152. Therefore, in the compression stroke, flow will leave mechanical actuator 52 at mechanical actuator lower portion 52L through opening 520P and pass through hose 152 to enter junction box 120 and pass through a second one-way check valve 110 located opposite of another intake one-way check valve 110 and then pass through hose 160 to enter one side of a T-connector or T-fitting 320 prior to exiting outflow one-way check valve 310 to exit to reef pipes or to shore.

Flow for all mechanical actuators will follow this similar travel path as explained in detail in the preceding paragraphs. However, by way of a second example for the longer hose 250, flow enters from the ocean through one-way check valve 210, and then enters second junction box 210. On the expansion stroke of mechanical actuator 50, ocean water travels from second junction box 210 towards mechanical actuator lower portion 50L (illustrated in FIG. 2) via hose 250 and into opening 500P. On the compression stroke of mechanical actuator 50, ocean water within mechanical actuator 50 is pushed out of opening 500P towards second junction box 220 via hose 250. Flow from mechanical actuator 50 then flows from second junction box 220 outwardly through another one-way check valve 210 located between second junction box 220 and hose 170. This same flow from mechanical actuator 50 then passes through hose 170 to an opposite side of the T-connector or T-fitting 320 prior to exiting outflow one-way check valve 310 to exit the reef pipes and which produces water under pressure to an onshore energy conversion apparatus.

Referring to FIG. 6, there is illustrated a double parallelogram structure 500 that consists of a first parallelogram (POG) structure 10 as defined above stacked vertically on top of a second parallelogram (POG) structure 10-S. In this embodiment, flotation member 140 is located directly above the upper POG. There is also a central axis 150 that allows the bottom POG of the double POG structure to be pivotally connected to the upper POG of the double POG structure. It should be understood that though no mechanical actuators are shown within the upper POG, the upper POG will have an even number of mechanical actuators located between side plates 70 and 72. Further, these mechanical actuators will function identically to the mechanical actuators previously described herein. All axles are rotatably attached to respective side plates 76 and 74 by rotatable attachment members 80.

It is also within the spirit and scope of this invention for the POG structure to be a triple, quadruple, or larger number under the same principle of having a central axis located between an upper POG and a lower POG. All the hose connections that will be extending away from each of the mechanical actuators will connect to at least one inflow check valve and will connect to an outflow check valve as well. Further, the combined water pressure generated from the mechanical actuators will be combined via hose connectivity and then sent to a single pipe or hose for energy conversion.

Figure 7A:
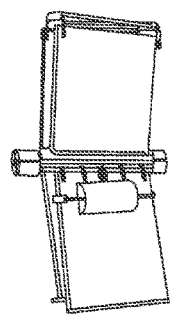
FIGS. 7A-7I are schematics of the varied positions that the double parallelogram structure can rotate into when waves act on the double parallelogram structure.
Figure 7B:
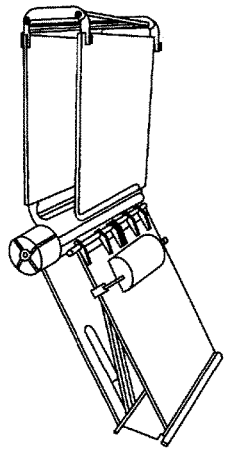
Figure 7C:
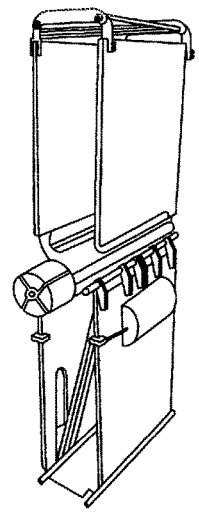
Figure 7D:
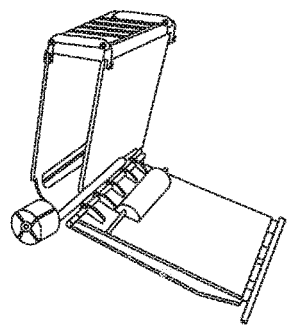
Figure 7E:
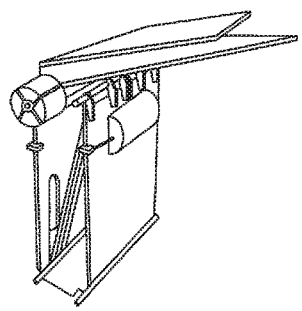
Figure 7F:
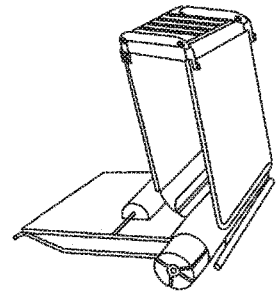
Figure 7G:
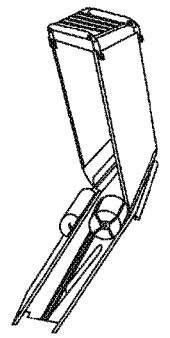
Figure 7H:
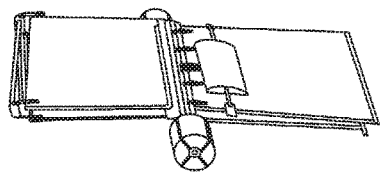
Figure 7I:
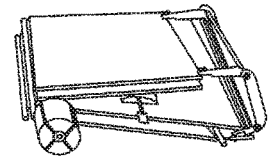

Referring to FIGS. 7A through 7I, FIGS. 7A through 7I are schematics of the positions the double POG structure is capable of moving in. In FIG. 7A, the lower POG is starting to move counterclockwise-clockwise and the upper POG is stationary. In FIG. 7B, the lower POG has moved substantially counterclockwise and the upper POG is expanding. FIG. 7C illustrates both upper POG and lower POG in starting vertical positions. In FIG. 7D, the lower POG has completely rotated counterclockwise and the upper POG is beginning o rotate clockwise. In FIG. 7E, the lower POG has returning the vertical and the upper POG have completely rotated clockwise. In FIG. 7F, the lower POG has completely rotated courter-clockwise and the upper POG has begun to rotate counterclockwise. In FIG. 7G, the lower POG has begun to rotate clockwise and the upper POG has begun to rotate counterclockwise. In FIG. 7H, the lower POG has completely rotated counterclockwise and the upper POG has completely rotated clockwise. In FIG. 7H, the lower POG has completely rotated clockwise and the upper POG has completely rotated clockwise. These varied positions allow the double POG to react to waves striking the side plates without damage to the structure. The bottom two positions 7H and 7I are particularly important because in these two positions the double POG (or single POG if only one is used) is capable of hiding from the waves during large storm events or extremely high energy waves.

Referring to FIG. 8, there is illustrated a schematic side view of a series of POG's, aligned in spaced apart locations. This could also be used with double POGs, triple POGs or any number of POGs stacked together and placed in series or in the same line. The configuration shown in FIG. 7 would allow multiple POGs to channel water pressure (pressure head) through a central hose or pipe 2000 for energy conversion.

For all of the embodiments discussed above, the one-way exit valves channel water under pressure into pipes 160, 162, 164 or 2000 which channel the water under pressure on shore to an energy conversion device such as a water turbine. The POG structures are affixed to a reef or ocean floor at a distance five miles or less from shoreline.

Figure 9:
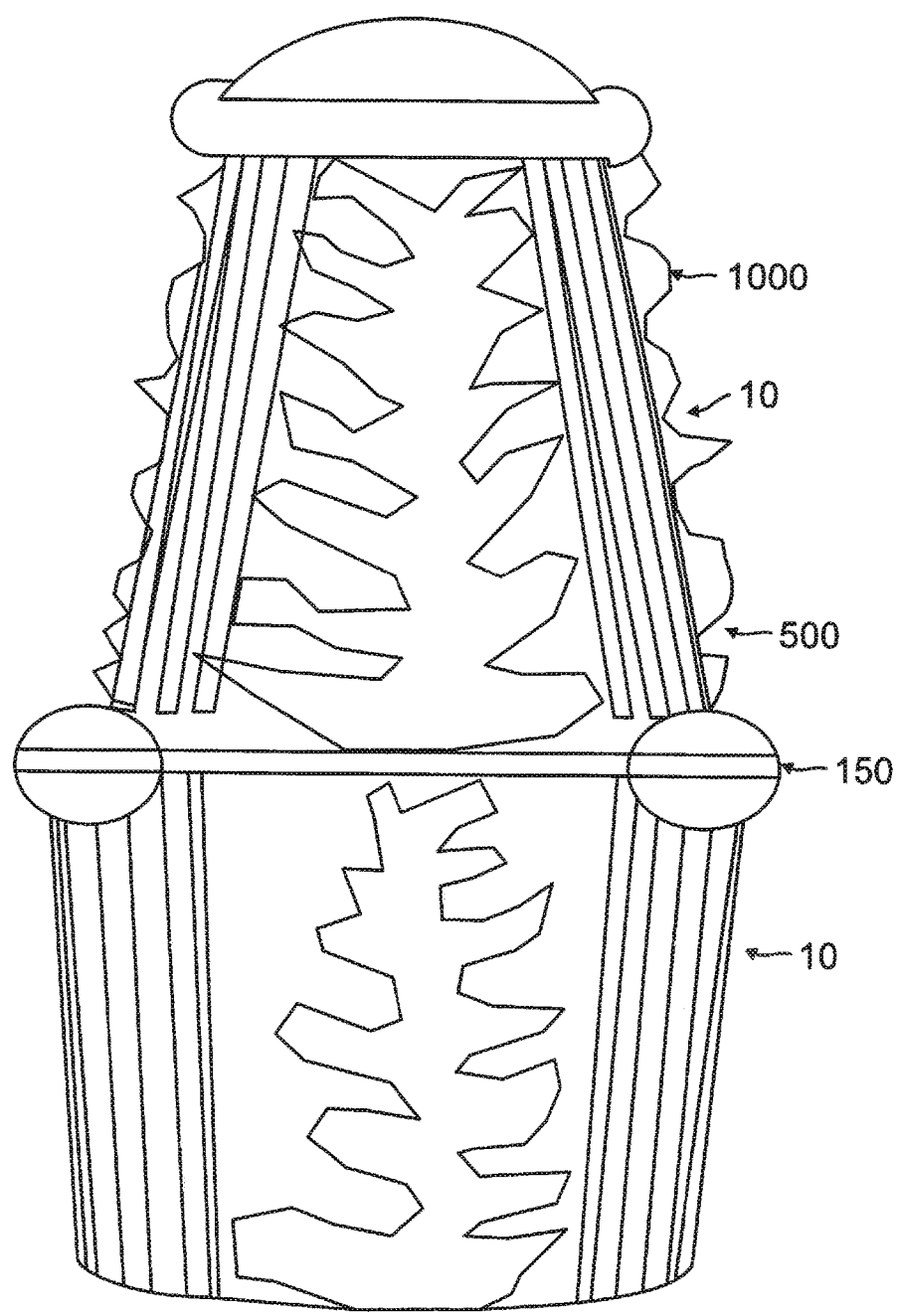
FIG. 9 is an elastomeric costume or cover that has been placed over the present invention to make it more ocean friendly through biomimicry.

Referring to FIG. 9, there is illustrated an elastomeric costume 1000 or cover that has been placed over the present invention double POG 500 consisting of a lower POG 10 connected by a central axis 150 to an upper POG 10 to make it more ocean friendly through biomimicry. This elastomeric exterior pull over will cover the POGs and can look like a species of kelp. It also allows the hoses from the actuators to be loose but contained under the costume or elastomeric covering.

The side plates 70 and 72 in the present invention can be made of any material such as metal, plastic, or a combination of metal and plastic. However, if the side plates are made of high density polypropylene ("HOPE"), they can be neutrally buoyant and extremely durable and used in the ocean.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A wave energy collector placed in ocean water at a given distance from a shoreline, the wave energy collector comprising:
   a. a parallelogram structure with a first side plate having a given width and a given height, a first axle affixed adjacent to a bottom of the first side plate and extending along the width of the first side plate, a second axle affixed adjacent to a top of the first side plate and extending along the width of the first side plate;
   b. a second side plate having a given width and a given height, a third axle affixed adjacent to a bottom of the second side plate and extending along the width of the second side plate, a fourth axle affixed adjacent to a top of the second side plate and extending along the width of the second side plate;
   c. a bottom plate affixed to the first side plate and affixed to the second side plate and a top plate affixed to the first side plate and affixed to the second side plate;
   d. a first mechanical actuator affixed at a first end to the first axle and affixed at a second end to the fourth axle and a second mechanical actuator extending in an opposite direction and affixed at a first end to the third axle and affixed at a second end to the second axle;
   e. a first one-way intake check valve connected to a first junction box, a first hose connected at one end to the first junction box and connected in fluid connection at a second end to said first mechanical actuator and a second hose connected at one end to said first junction box and connected in fluid connection at a second end to said second mechanical actuator;
   f. a first one-way exit check valve connected to the first junction box and located opposite to the first one-way intake check valve, a first connector hose connecting the first one-way exit check valve to a water transport pipe affixed to the parallelogram structure; and
   g. the first side plate and the second side plate move in a counterclockwise direction when impacted by an onshore wave causing the second mechanical actuator to expand and suck in water during an expansion stroke and concurrently causing the first mechanical actuator to compress and push out water during a compression stroke, and when the first and second side plates are impacted from an onshore wave, the first and second side plates move in a clockwise direction causing the first mechanical actuator to expand and suck in water during an expansion stroke and concurrently causing the second mechanical actuator to compress and push out water during a compression stroke, the expansion stroke causing water to enter through the first one-way intake check valve and flow through the respective first or second hose to be stored in the respective first or second mechanical actuator and the compression stroke pushing water out of the respective first or second mechanical actuator, through the respective first or second hose and through the first one-way exit check valve to the first connector hose connecting to the water transport pipe;
   h. whereby pressurized water is transported through the water transport pipe to an inshore apparatus which converts the pressurized water into a source of power or for desalinization;
   i. wherein the wave energy collector is a double parallelogram structure comprising a first parallelogram wave energy collector including a first set of elements a, b, c, d, e, f, g and a second parallelogram wave energy collector including a second set of elements a, b, c, d, e, f, g and affixed to a top of the first parallelogram wave energy collector by a central axis.

2. The wave energy collector in accordance with claim 1, further comprising, in at least one of the first and second parallelogram wave energy collectors:
   a. a third mechanical actuator affixed at a first end to the first axle and affixed at a second end to the fourth axle and a fourth mechanical actuator extending in an opposite direction and affixed at a first end to the third axle and affixed at a second end to the second axle;
   b. a second junction box directly connected to a second one-way intake check valve, a third hose connected at one end to the second junction box and connected in fluid connection at a second end to said third mechanical actuator and a fourth hose connected at one end to said second junction box and connected in fluid connection at a second end to said fourth mechanical actuator;
   c. a second one-way exit check valve connected to the second junction box and located opposite to the second one-way intake check valve, a second connector hose connecting the second one-way exit check valve to a T-connector, the first connector hose from the first one-way exit check valve also connecting to the T-connector, the T-connector having a third exit check valve connected to a third connector hose connected to the water transport pipe affixed to the parallelogram structure; and d. the first side plate and the second side plate move in a counterclockwise direction when impacted by an on-shore wave causing both the second mechanical actuator and the fourth mechanical actuator to expand and suck in water during an expansion stroke and concurrently causing both the first mechanical actuator and the third mechanical actuator to compress and push out water during a compression stroke, and when the first and second side plates are impacted from an onshore wave, the first and second side plates move in a clockwise direction causing the first and third mechanical actuators to expand and suck in water during an expansion stroke and concurrently causing the second and fourth mechanical actuators to compress and push out water during a compression stroke, the expansion stroke causing water to enter through the first one-way intake check valve and flow through the respective first or second hose to be stored in the respective first or second mechanical actuator and the compression stroke pushing water out of the respective first or second mechanical actuator, through the respective first or second hose and through the first one-way exit check valve to the first connector hose connecting to the T-connector, and the expansion stroke causing water to enter through the second one-way intake check valve and flow through the respective third or fourth hose to be stored in the respective third or fourth mechanical actuator and the compression stroke pushing water out of the respective third or fourth mechanical actuator, through the respective third or fourth hose and through the second one-way exit check valve to the second connector hose connecting to the T-connector and the third exit valve connected to the water transport pipe.

3. The wave energy collector in accordance with claim 1, further comprising a flotation member affixed to an upper portion of said double parallelogram structure.

4. The wave energy collector in accordance with claim 1, wherein said side plates are made from a material selected from the group consisting of: metal, plastic, metal and plastic, and high density polypropylene.

5. The wave energy collector in accordance with claim 1, further comprising a cover made of an elastomeric material covering the double parallelogram structure.

6. The wave energy collector in accordance with claim 1, further comprising: a multiplicity of identical wave energy collectors spaced apart and in line with a single water transport pipe.

* * * * *